United States Patent [19]

Carnegie et al.

[11] Patent Number: 5,745,884
[45] Date of Patent: Apr. 28, 1998

[54] SYSTEM AND METHOD FOR BILLING DATA GRADE NETWORK USE ON A PER CONNECTION BASIS

[75] Inventors: John Carnegie, Plano; William J. Reid, Dallas, both of Tex.

[73] Assignee: Mobile Area Networks, Inc., Heathrow, Fla.

[21] Appl. No.: 733,942

[22] Filed: Oct. 21, 1996

[51] Int. Cl.$^6$ .................................................. G06F 19/00
[52] U.S. Cl. ........................................................ 705/34
[58] Field of Search ..................... 705/34; 379/100.06; 455/406

[56] References Cited

U.S. PATENT DOCUMENTS

| | | | |
|---|---|---|---|
| 3,764,747 | 10/1973 | Nakajima et al. | 455/407 |
| 5,065,393 | 11/1991 | Sibbitt et al. | 370/360 |
| 5,187,710 | 2/1993 | Chau et al. | 370/524 |
| 5,351,286 | 9/1994 | Nici | 370/352 |
| 5,600,643 | 2/1997 | Robrock, II | 370/399 |

OTHER PUBLICATIONS

Jin Wolf, "The Ricochet Wireless Modem Keeps You in Touch," *Computer Shopper*, Dec. 1996, p. 196.
Frank Hertz, "Wireless Wonders Make Yourself Reachable Anywhere," WyndMail product, *Success Magazine*, Jan./Feb. 1997, p. 67.

*Primary Examiner*—John E. Harrity

[57] ABSTRACT

A system and method in which remote users may be billed, on a per connection basis, for universal data grade access to their home office servers. Portable device 101 is carried by a transient remote user within wireless range of an Access Point (AP) 110 deployed at, for example, a hotel or airport lounge. Signalling resource 105 inside portable device 101 automatically initiates wireless contact with AP 110. Wireless contact with AP 110 includes a data grade network address of a destination server 130 to which portable device 101 desires to be connected. AP 110 contacts destination server 130, over Internet/data grade WAN 120. Destination server 130 in turn establishes a secure tunnelled Internet Protocol (IP) 124 with portable device 101 through AP 110. Information such as data-rich files or e-mail is then automatically exchanged between destination server 130 and portable device 101. When the remote user logs on later to portable device 101, applications programs may be refreshed with new information such as files or e-mail, received from destination server 130 since the previous logon. Likewise, files or e-mail previously identified by the user to be sent out will have already gone. Billing for this service is easily facilitated on a per user, per connection basis, since establishment of tunnelled IP 124 creates a recordable billable event for which either the remote user or the destination server 130 may be invoiced.

7 Claims, 3 Drawing Sheets

SYSTEM AND METHOD FOR BILLING DATA GRADE NETWORK USE ON A PER CONNECTION BASIS

TECHNICAL FIELD OF THE INVENTION

The invention generally relates to a data communications service billing and, more particularly, is directed to a system and method for billing, on a per connection basis, for services consumed by users of portable smart devices (e.g., notebooks, personal computers, PDAs, etc.) while connected remotely to home office local area networks or similar information service providers over a publicly-available data grade communication network.

BACKGROUND OF THE INVENTION

Recent technology improvements have resulted in smaller, lighter and more portable computing devices, enabling a wide variety of new applications and users to emerge. Users typically operate such portable devices in stand alone mode, but also need to exchange information with a centralized system from any remote location.

There are currently two main forms of communication carrier technology enabling remote connectivity with a central system: voice grade and data grade. Voice grade is favored by remote users to communicate with a central system because of its almost universal availability in the field through the Public Switched Telephone Network ("PSTN"). Further, billing for usage on a per user, per connection basis is relatively straightforward because the connection topology usually involves the PSTN, a carrier system already well disposed to bill users in such fashion. The main disadvantage is that voice grade connections have limited data transfer speed and bandwidth capabilities, making remote operation of rich data applications slow, if not impossible.

Data grade communication generally does not suffer from these speed and bandwidth limitations. As will be discussed, the availability of new network technology has greatly increased data transfer capacity, enabling users to run rich data applications remotely. The disadvantage of data grade communication, however, is that a publicly-available network has yet to be deployed to which remote users can connect. Further, in part because there is no public network available, billing for use of data grade communications is generally not on a per user, per connection basis.

The foregoing background will now be discussed in more detail.

Voice grade communication

Remote users typically connect their portable computing devices through a modem (digital to analog signal conversion) interface into a voice grade Local Exchange Carrier (LEC). The information is then passed to an Inter-Exchange Carrier (IXE), back to a target LEC, to a receiving modem (analog to digital signal conversion) interface, and, finally, into a gateway for the target centralized system, usually a local area network server device.

Modem connections thus enable the existing regulated voice call infrastructure of telecommunication suppliers to carry binary information such as e-mail, work files or fax. It should be noted that the voice network infrastructure is currently regulated into separate markets for Local Exchange Carriers (LEC) and Long Distance Exchange Carriers (IXE). This regulation adds additional, and, in comparison to data grade communication, unnecessary cost to information transfers.

The main disadvantage of voice grade communication over data grade communication, however, is that voice grade transmission speed is limited by the modem speed, the phone line bandwidth capability and switching speed, as well as the respective processing capabilities of the remote computer and the target network. In practice, this speed limitation causes remote users in the field to forego high-productivity, data rich computer applications that might otherwise be available in the office. This makes it difficult for remote users to check schedules, receive rich-object messages, search corporate databases, or use corporate client-server applications when in the field.

With regard to billing for voice grade communication, reliance on the PSTN for remote access and connectivity facilitates per user, per connection billing. Identification of the remote user to billed for a session may be made by either tagging the originating modem or by recording who placed the connecting call. Then, conventional telephone connection charges may be billed to that identified user in the same way that a voice call would be billed.

For instance, in a hotel room, the physical location of the modem-equipped computer is associated with the hotel room number. The remote user may thus be identified by originating modem. Alternatively, authority for remote access from, for example, an airport lounge will require some type of transient caller identification, such as a credit card. The remote user may thus be identified by caller identity. Billing for the connection is then handled by conventional phone company billing. These billing methods accrue the charge to the phone location or to the credit card. Additional surcharges (such as airport access, hotel, etc.) may be added.

In voice grade communication, the LEC and IXE are already set up to bill for services on a per connection basis. Generally, the charge is the connect time multiplied by rate, plus any surcharges. Since the remote user is identified, billing on a per user, per connection basis thus becomes straightforward.

It should also be noted that the receptacle into which a remote voice grade user must plug a modem is typically a telephone wall jack. These wall jack connections are particularly difficult to access in public locations such as airport lounges and convention centers. This access difficulty may be overcome by using a cellular phone with a cellular modem. Similar advantages and disadvantages apply, however, to cellular access over land line access. Remote access is widely available, and billing is easily accrued to the owner of a cellular telephone account. On the other hand, data transfer speed and bandwidth is again limited. Further, wireless connections suffer from the additional consideration that the connection from the remote user generally goes through both a wireless network and a land line network. The speed and bandwidth capabilities of both networks will thus limit data transfer.

Data grade communication

It will be understood from the above discussion that voice grade communications generally use the PSTN to carry data via a modem in the voice bandwidth. Such voice grade connections are generally made using traditional copper wire networks. In contrast, rapid advancements of data grade communication facilities such as ISDN, T1, and fiber optics 'have made data grade communication increasingly available.

As noted, the main advantage of data grade communication over voice grade communication is that information, and particularly non-voice information, can be transferred much more quickly over data grade lines. As a result, data-rich objects such as e-mail, images, and applications workfiles may be transferred much more expediently and effectively than over voice grade lines using a modem. For purposes of this disclosure and the claims that follow, "data grade" means the transfer of information at rates of 64,000 bits per second or higher. This speed happens also to be the voice information transfer rate in the DS-0 voice channel in digital networks.

Although private data grade networks are widely deployed, they are restricted to specific groups of users. They are, therefore, unavailable to the "general public" population of most remote users in the field. Further, there is currently no satisfactory per user, per connection billing system for these networks. Not only is a lack of an effective billing system considered to be a drawback in itself, but it is also considered to be deterring wider deployment of a public data grade network.

Data grade communication requires a digital interface (as opposed to a modem) between the remote computer and the network. Typically, an Ethernet connection may be used. Such connections are enabled easily for users working out of a fixed location, such as an office. Local area networks ("LANs") or even wide area networks ("WANs") may be established using shared or dedicated data communications connections provided by a LEC. Normally, the data flows from the computer to the LAN or WAN and then directly to the LEC.

Access to data grade networks, however, is very rarely available in public locations. There are simply very few public access points at which a remote user can connect. Additionally, most data grade lines are themselves leased to specific users, who then typically restrict access to their own authorized employees. As a result, even if access points were available, there would be few "public use" lines to connect to.

Data grade communication thus does not currently have a concept of an individual user. Consequently, as noted, billing tends not to occur on an individual basis. Instead, billing for data grade network traffic is usually initiated and collected at end points to the data network on a per line basis, regardless of the usage thereof. Differing rates to users are typically based only on the speed capability of the line, although sometimes rates may also be dependent on the physical connection distance between user access points. Rates also tend to vary widely geographically around the country.

It will thus be seen that billing systems on a per user, per connection basis are currently low considerations in the deployment of data grade networks. As publicly-accessible data grade networks become more widely accessible, however, it will be readily seen that a per user, per connection billing system will become highly advantageous to operators of such networks to facilitate collection of revenues for service.

One well-known publicly-available data-grade network is the Internet. Public access is generally through Internet Service Providers ("ISPs") who make access available through a series of file servers operated by the ISP. Despite its public availability, however, Internet access is still currently not a viable option for remote users seeking data grade connectivity. Unless the ISP has a national toll-free access number, the transient user faces either paying long distance connection charges, or frequently resetting communications software to connect via local ISP access numbers.

There are also very few access points available in the field that support a data grade interface to the ISP. Further, even if data grade access points were available in public places, they would be of little value to remote users unless those remote users could use the access points to universally connect to their respective individual ISPs. To date, there is no mechanism deployed for multiple ISPs to "share" a publicly-available data grade access point.

It should also be noted that unlike voice-grade communications that typically operate on a "one-user, one line" basis, multiple users of data grade lines are disposed to share bandwidth in a single physical link. To date, there is also no mechanism deployed for multiple data grade users to "share" bandwidth through publicly-available data grade access points.

Of course, connection to ISPs over PSTN voice grade lines addresses the problem of multiple ISPs "sharing" access points and multiple users "sharing" bandwidth. In fact, remote modem access to the Internet is widely available through the PSTN. A modem is, nonetheless, a voice grade interface to voice grade lines on the PSTN. The modem and the PSTN connection thus becomes a "bottleneck", restraining data transfer speed to a ceiling of the modem and/or line capabilities.

There is therefore a need to allow remote users to be able to gain data grade access to centralized home systems from multiple, widespread locations in the field. Alternatively, there is a need to allow remote users to be able to gain data grade access to the Internet from multiple, widespread locations in the field.

SUMMARY OF THE INVENTION

The present invention allows a mobile user to obtain high speed access to his corporate local area network from frequently traveled locations, while being individually billed (or his corporation being billed) for such access on a per connection basis.

The present invention assumes deployment of a preexisting data grade network to which the remote user's home office or other destination is already connected. This may be a WAN or the Internet, or another data grade network allowing access to authorized users, as are becoming increasingly common in the art.

The present invention provides access points ("APs") for remote users to obtain access to the pre-deployed data grade network. The APs enable such access by providing strategically placed antennas that cover predetermined locations known to be frequented by transient remote users, such as hotel rooms or airport lounges. APs may then receive local wireless transmissions from remote users carrying portable devices having compatible local wireless communication capability. In a preferred embodiment, this wireless communication operates in the RF band according to cordless telephony technology known in the art.

To enable the wireless connection, the user's portable device energizes a signalling resource provided therein. This may advantageously be embodied, for example, on a card inserted into a portable laptop PC.

When a user carries the portable device within range of an AP antenna, the AP detects a transmission from the signalling resource within the portable device, and recognizes the user through codes within the signal. The AP then establishes a wireless data connection.

For instance, establishment of the connection and the subsequent information transfer could take place as a user exits an airplane and is detected by an AP antenna serving an airport lounge. Alternatively, the connection and transfer could occur as the user enters a hotel room where AP antennas have been installed somewhere in the hotel.

Once in wireless communication with remote users, APs then establish data grade WAN or Internet connections for those users to destination servers specified by those users, such as their home offices. Publicly available data grade connectivity is thus enabled.

In one aspect, the AP thus acts similarly to a wireless Local Area Network ("LAN") serving remote users who bring portable devices within range. A major difference over traditional wireless LANs, however, is that according to the present invention, the LAN is unrestricted and publicly accessible. Any remote user in the general public who brings a compatible signalling resource in wireless range of an AP may attach to that AP's LAN.

Further, functionality within the LAN is directed primarily to routing that remote user's wireless communications to a destination server connected to a different data grade WAN, such as the Internet. As such, therefore, the AP also acts as a router enabling communication between two networks with dissimilar protocols. For example, the LAN typically will have a specialized protocol (e.g. ethernet, token ring) disposed for wireless attachment and asynchronous or "packetized" data transfer (such as IPX or TCP/IP). In contrast, the WAN connection may be, for example, a connection with a dissimilar "packetized" protocol to the LAN (such as TCP/IP, SMDS or IPX).

Further still, intelligence within the AP receives WAN destination addresses supplied in LAN communications from remote users as they attach to the LAN, and then connects those remote users to WAN destination servers identified by those addresses. The AP thus acts as a gateway between the LAN and the WAN.

Of course, as independent remote users start to share bandwidth in data grade connections established by the AP, privacy and security of information become major concerns. According to the present invention, authentication, privacy and security are enhanced by a tunneled protocol encapsulating the communicated information while in transit on the network. Thus, a secure communication tunnel is established from the portable device to the destination home system. Information in the tunnel may advantageously also be encrypted if further security is desired.

The enablement of this tunneled protocol further establishes a billable event for a particular remote user communication. Each time a remote user becomes connected to a home system via a tunneled protocol, the remote user and the home system necessarily become identified through execution of authorization procedures. The enablement of the tunneled protocol may further be memorialized by date, time, and AP at which the remote user is connected. This information may be stored for billing purposes on a per user, per connection basis.

It is therefore a technical advantage of the present invention to provide a system and method whereby remote users may access a data grade network universally from frequently-traveled locations such as hotels and airports, or from communal private locations, such as apartment complexes or office buildings. The Access Points (APs) at which remote users connect then establish data grade connections to destination servers over the Internet or another data grade WAN.

It is a further technical advantage for this access to be facilitated by local wireless connection, enabling transfer of information without physical hookup to a wall jack or similar receptacle.

It is a further technical advantage that this connection may also establish a tunneled protocol to encapsulate information communicated to and from the remote users. Information is also advantageously encrypted for further security. In this way, privacy of information is achieved among remote users sharing data grade network bandwidth.

It is a further technical advantage that the remote user's portable device advantageously contains a separate, signalling resource to initiate and establish the wireless connection. In this way, signalling between the remote user and an AP may be initiated upon the remote user coming into the AP's wireless range, without necessarily fully powering up the portable device, and also advantageously prior to any physical interaction between the remote user and the portable device.

A still further technical advantage is that the enablement of the tunneling protocol establishes a billable event, in which remote user, home system, AP, date and time may be recognized and stored. As a result, billing for use of the network may be allocated on a per user, per connection basis.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction, with the accompanying drawings, in which.

DETAILED DESCRIPTION OF THE INVENTION

The present invention is directed to universal access to a data grade network. As noted above, for purposes of this disclosure and the claims that follow, "data grade" means the transfer of information at rates of 64,000 bits per second or higher.

Architecture and topology

Figures 1, 1A:
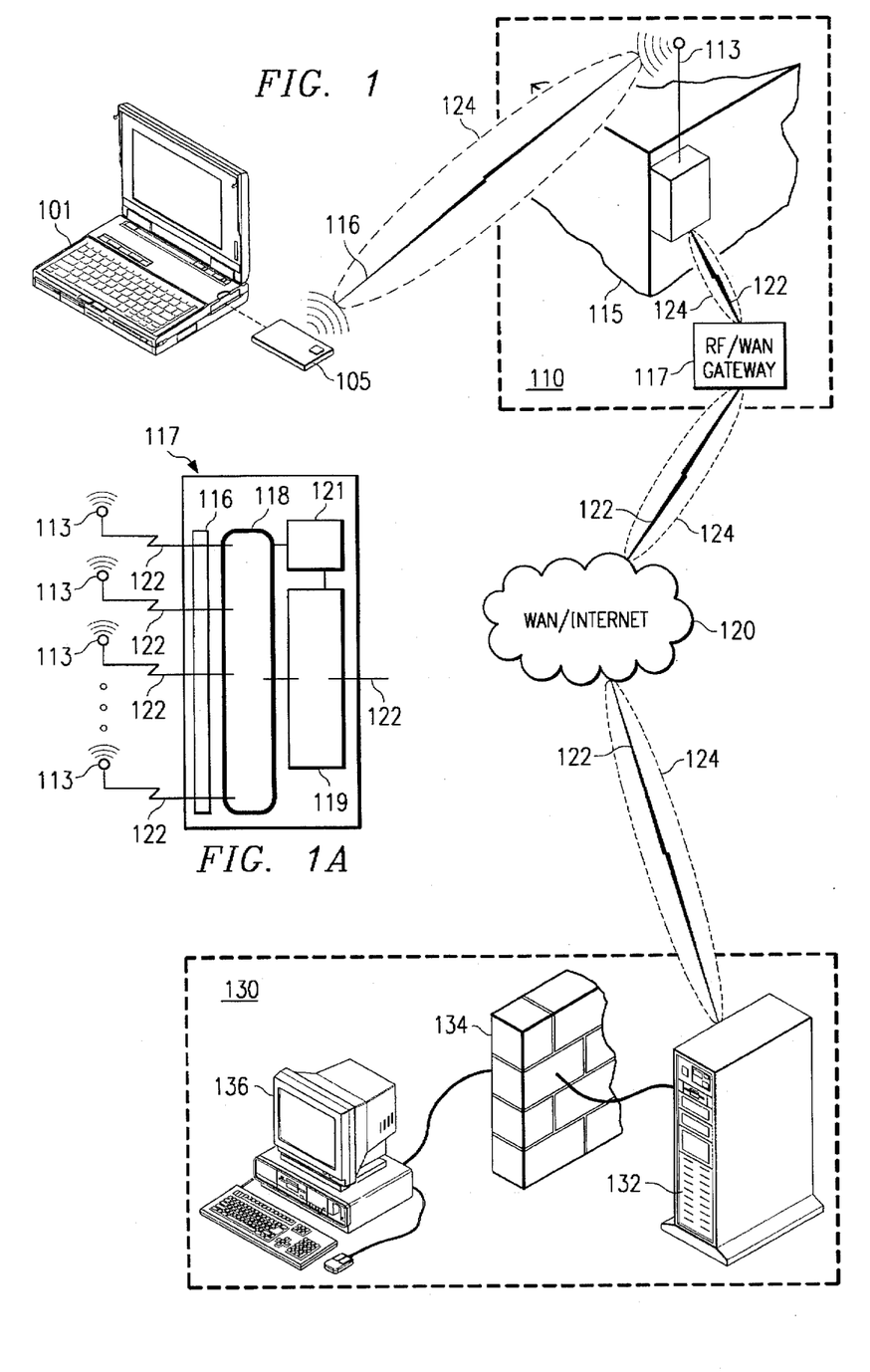
FIG. 1 is a functional block diagram illustrating exemplary architecture and topology embodying the present invention.
FIG. 1A is an enlargement of gateway resource 117 showing details thereof.

FIG. 1 is a functional block diagram illustrating exemplary architecture and topology embodying the present invention. A remote user has portable device 101, illustrated on FIG. 1 as a notebook computer, although it will be understood that consistent with the present invention, portable device 101 may be any other portable device capable of remote digital information processing. such as a Portable Data ("PDA") terminal, Personal Communications System ("PCS") device, hand-held computer, pen-based computer, etc. Portable device 101 includes a signalling resource 105, which in turn includes a transmitter/receiver (not illustrated) disposed to wirelessly export and import digital information to and from portable device 101. In the case of the notebook computer illustrated in FIG. 1, signalling resource 105 may advantageously be embodied on a PC card fitted into a slot on the computer. Commercially available wireless Local Area Network ("LAN") cards will be understood by those in this art to be readily suited to this application with minimal customization. It will be appreciated, however, that the scope of the present invention is not limited to any particular means of providing a signalling resource 105.

Signalling resource 105 within portable device 101 is disposed to communicate with Access Points (APs) 110 whose antennas 113 are strategically located at places in a building 115 commonly frequented by transient users, such as an airport lounge or hotel. As illustrated on FIG. 1, APs 110 comprise one or more antennas 113 deployed within building 115 so as to serve transient users with portable devices 101 as the users travel through building 115. For example, antennas 113 may be deployed in elevator shafts or in ceiling spaces so as to be unobtrusive but nonetheless disposed to cover an optimum range throughout building 115.

When users are in range of an antenna 113, signalling resource 105 within portable device 101 sets up wireless communication 116 between portable device 101 and AP 110. In a presently preferred embodiment, wireless communication 116 is advantageously an FM communication in the RF band, consistent with short-range communications enabled by cordless telephony circuitry standard in the art. Exemplary operating frequencies such as 2.4 GHz or 5.7 GHz are advantageous. Such a wireless link may be expected to be reliable up to approximately 250 feet, with an anticipated data transfer rate of up to 1 mbits/sec. It will be appreciated, however, that the present invention is not limited to any particular wireless technology enabling wireless communication 116.

APs 110 also include a gateway resource 117, which may be resident in building 115, or may be further decentralized according to deployment design. Gateway resource 117 locates a destination server 130 identified by portable device 101 in wireless communication 116, and then enables portable device 101 to connect thereto. As will be further described below, gateway resource 117 also converts wireless-carried asynchronous (or "packetized") digital communications sent to and from portable device 101 into dissimilar "packetized" formats suitable to be communicated with destination server 130 over the Internet or another pre-existing data grade Wide Area Network ("WAN") 120.

Data grade connections 122 connect APs 110 with Internet/data grade WAN 120. Consistent with the present invention, data grade connections 122 may be enabled by technology known in the art, such as ISDN, T1, fiber optic, ADSL (Asymmetric Digital Subscriber Line) or even cable television lines. Destination server 130 is similarly connected to Internet/data grade WAN 120 via data grade connections 122. Accordingly, it will be seen on FIG. 1 that responsive to a wireless communication 116 from a user's portable device 101, AP 110 establishes a data grade connection 122 via Internet/data grade WAN 120 to destination server 130. Portable device 101 may then exchange information, at data grade quality and speeds, with destination server 130 over Internet/data grade WAN 120.

FIG. 1 further illustrates features of the present invention that enhance security of a remote exchange of information between a user's portable device 101 and destination server 130. Wireless communication 116 between portable device 101 and AP 110 may be made secure by technology standard in the short-range cordless telephony art, such as transmitter/receiver code rotation and matching. As will be further described below with reference to FIG. 2, destination server 130 and software in portable device 101 are disposed to set up a tunnelled Internet Protocol ("IP") 124 over data grade connection 122 once initial contact by portable device 101 has been made via AP 110. Although tunnelled IP 124 itself provides a heightened level of information security, further security may be achieved, if desired, by also encrypting information exchanged between AP 110 and destination server 130 over Internet/data grade WAN 120.

Destination server 130 comprises security server 132, which interfaces with Internet/data grade WAN 120 and, as necessary, decrypts tunnelled IP 124 and any further encryption. Remote communications are then routed through firewall 134 and on to host processor/file server 136.

Processing flow

Figure 2:
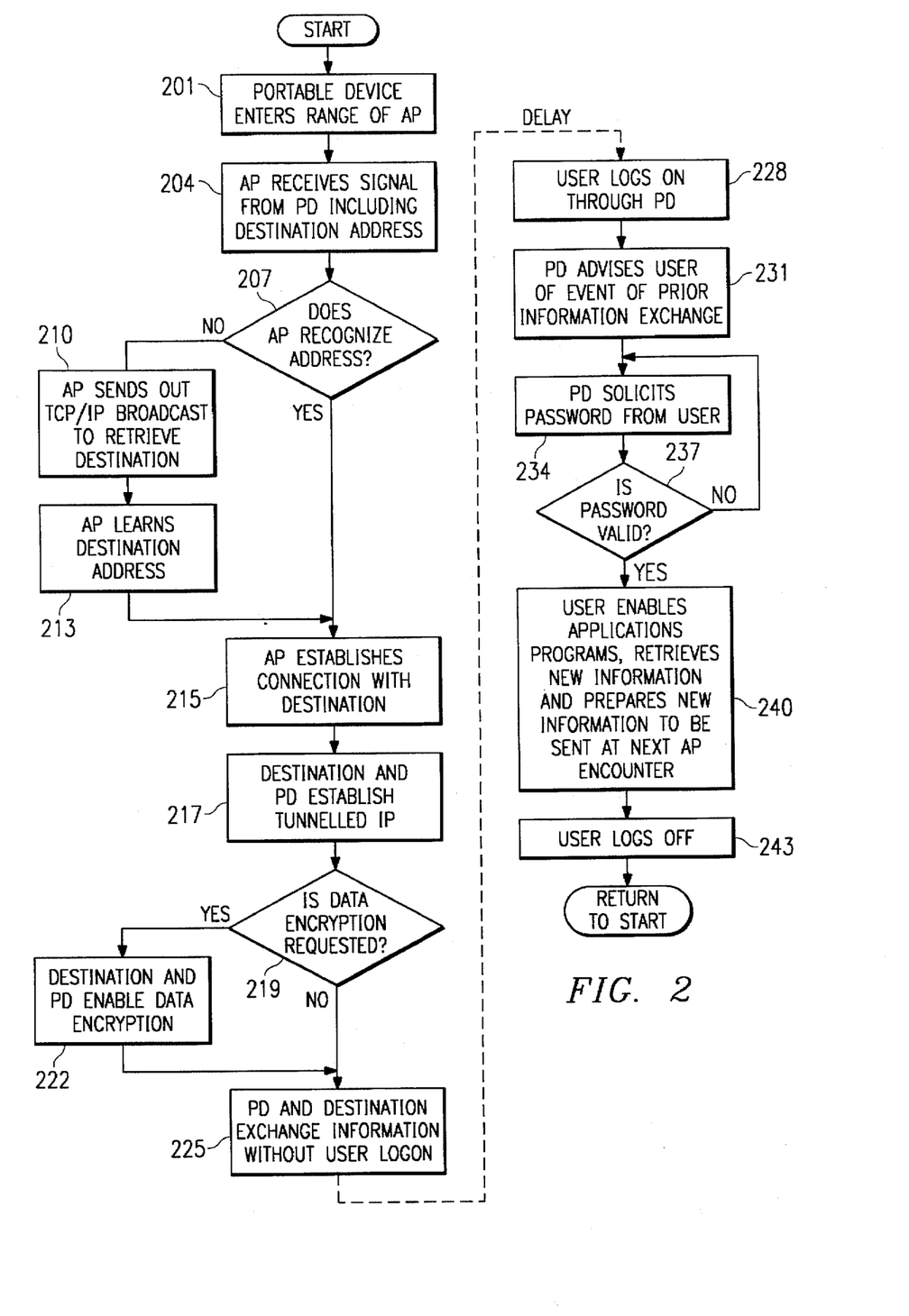
FIG. 2 is a flow chart describing an exemplary processing cycle according to the present invention.

FIG. 2 is a flow chart describing the general processing cycle in a presently preferred embodiment of the present invention. The following description of FIG. 2 should also be read with reference to FIG. 1.

The processing cycle begins at block 201, when a user brings a portable device 101 within wireless range of an AP 110. Moving on to block 204, and as previously described with reference to FIG. 1, AP 110 then sets up a wireless communication 116 with portable device 101. The initial signals from portable device 101 to AP 110 comprise the network address of destination server 130 with which the user desires to exchange information, as well as user signature information.

Continuing on FIG. 2 to block 207, AP 110 first determines whether it recognizes the network address sought by portable device 101. AP 110 may do this by checking against network address/destination server records available to it. If AP 110 does not recognize the network address, it sends out a network broadcast request over Internet/data grade WAN 120 to identify the destination server associated with the network address sought by portable device 101 (block 210). Upon receiving a response to the request, AP 110 updates its records (block 213).

Now having identified destination server 130, either from previous records or by broadcast request, AP 110 now establishes data grade connection 122 with destination server 130 over Internet/data grade WAN 120, so that portable device 101 may come into communication with destination server 130 (block 215).

Once data grade connection 122 is established, destination server 130 and portable device 101 then establish tunnelled IP 124 between them (block 217). To do this, destination server 130 first identifies the user associated with portable device 101 by user signature information also included in initial signals from signalling resource 105. The software in that user's portable device is known by destination server 130 to have the first part of a two-part encryption key securing a predetermined tunnelled IP algorithm. Destination server 130 has the second part of the key. The software in portable device 101 may thus combine with destination server 130 to establish secure tunnelled IP 124 for subsequent communication between them.

Having established tunnelled IP 124, destination server and portable device 101 may optionally overlay further data encryption through tunnelled IP 124 according to predetermined data transfer encryption arrangements (blocks 219 and 222).

The link between destination server 130 and portable device 101 is now ready for secure information exchange. In block 225, destination server 130 automatically downloads files, e-mail or other information to portable device 101 that may have previously been identified at destination server 130 for communication to the user. Likewise, portable device 101 automatically uploads files, e-mail or other information to destination server 130 that the user may previously have identified for transmission to destination server 130. Once information transfer is complete, data grade connection 122 and tunnelled IP 124 are terminated. A timer controlling signalling resource 105 may then optionally be disposed to prevent signalling resource 105 from initiating further contact with an AP antenna 113 for, say, 20 or 30 minutes.

It will be appreciated that the foregoing processing and secure information exchange has so far been enabled automatically, without the necessity of the user logging on. It will be further understood that at data grade transfer rates, this automatic processing and information transfer may be expected to take only a few seconds to complete, and easily within a time period during which the user may be passing within range of an AP antenna 113 while, for example, walking off an airplane and through an airport lounge.

The processing cycle continues, with further reference to FIG. 2, when the user physically logs on through portable device 101 (block 228). Note, however, that in accordance with the present invention, the user may not physically log on until much later. It will therefore be appreciated that prior to the user logging on, there may be several automatic information transfers according to blocks 201 through 225, if signalling resource 105 inside portable device 101 passes within range of multiple AP antennas 113. In this way, the information available to the user from destination server 130 upon logging on will be as current as possible.

Upon logging on, portable device 101 advantageously notifies the user that one or more automatic information transfers have occurred since the previous logon (block 231). The user then presents a user ID and a password in the traditional way (blocks 234 and 237). The new information (such as files and e-mail) obtained from destination server 130 since the previous logon is now available to the user for use in applications software resident on portable device 101 (block 240). The user may also create information, such as responsive files or e-mail, to send back to destination server 130 the next time an AP antenna 113 is encountered. When finished, the user logs off (block 243) and the processing cycle returns to the start.

It will be appreciated that in this way, remote users gain universal access to their home office servers (as embodied by destination server 130) over a data grade network. Data-rich objects may be exchanged without the inconvenience of physically finding and hooking up to a publicly-available data grade access point. Transient remote users thus exchange information with their home office servers automatically, simply by passing through facilities such as airports and hotels.

It will be further appreciated that in this way, remote users may also simulate universal real time access to their home office servers by logging on within range of an AP antenna 113. Then, by temporarily disabling the timer, if any, delaying signalling resource 105 from initiating further contact with an AP antenna 113, signalling resource 105 will continuously attempt to remain in contact with destination server 130. The user may run applications programs with information repeatedly refreshed to and from destination server 130 on an apparent real time basis.

Gateway resource functionality

It will be appreciated that a novel feature of the present invention is gateway resource 117, which, according to the connectionless manner in which the present invention operates, provides server, router and gateway functionality.

FIG. 1 illustrates gateway resource 117 in one aspect as having server functionality, in that multiple portable devices 101 coming within range of antennas 113 may be served substantially concurrently by AP 110 via wireless communications 116. In one sense, AP 110 may be envisaged as a publicly available data grade wireless LAN, whereby any remote user may freely attempt attachment (subject to available bandwidth) by bringing a signalling resource 105 within range of antenna 113. In comparison to voice grade communication, this is somewhat analogous to a person walking up to a public telephone and lifting the receiver.

This server or "LAN" functionality of AP 110 is illustrated in FIG. 1A in the detail enlargement of gateway resource 117. Antennas 113, bridge/router resource 119 and processor/server 121 all connect to ethernet 118. The interconnecting function of ethernet 118 may also be performed by other networking architecture known in the art, such as a token ring, etc. Processor/server 121 controls the general operation of ethernet 118, as well as particular features of bridge/router resource 119. Wireless LAN bridge 116 enables wireless communication with ethernet 118 via antennas 113.

As noted already, the primary purpose of remote users wirelessly attaching to the "LAN" of AP 110 is to connect to and exchange data with destination server 130, which may be found on Internet/data grade WAN 120. The "LAN" of AP 110 will therefore typically operate according to ethernet 118 or another LAN-based protocol, in TCP/IP, IPX or other asynchronous (or "packetized") format. Internet/data grade WAN 120, in contrast, typically operates in a UNIX environment according to a dissimilar protocol, and where destination server 130 may be counter-disposed to require communication in a dissimilar "packetized" data format such as SMDS, IPX or TCP/IP.

With further reference to FIG. 1A, gateway resource 117 therefore also provides router functionality enabling portable device 101 on the "LAN" side to be in data grade communication with destination server 130 on the "WAN" side. Bridge/router resource 119, also attached to ethernet 118, enables communication between the "LAN" side and the "WAN" side as required. Processor/server 121 controls this router functionality.

It will also be seen that when portable device 101 connects initially to the "LAN" side, it supplies AP 110 with only a "WAN" side network address with which to locate destination server 130. Processor/server 121 therefore processes the network address as described in reference to FIG. 2 above, either by looking up previously learned addresses or by sending out broadcast requests over Internet/data grade WAN 120. Gateway resource 117 therefore also provides gateway functionality in locating and connecting to destination server 130.

It will be further appreciated that not all portable devices 101 attaching to AP 110 may have sufficient processing power to operate as a fully-enabled "node" of ethernet 118. This may be particularly true if smaller devices, such as PDA terminals, PCS devices and hand-held computers are attaching. Processor/server 121 is therefore further disposed to support the attachment of such less powerful devices to ethernet 118 so as to enable full data grade communication in accordance with the present invention.

LAN design should also not overlook that digital bandwidth in an ethernet environment may not be expected to be reliable above 10 mbits/sec. Similarly, digital bandwidth in a token ring environment may not be expected to be reliable above 8 mbits/sec or 16 mbits/sec, depending on the hardware configuration selected. Accordingly, depending on the number of users expected to be served simultaneously by a single AP 110, multiple gateway resources 117 with switching control, perhaps in processor/server 121, may be necessary at APs 110 in order to maintain acceptable data transfer rates.

Power source considerations

The foregoing describes an environment in which the present invention is disposed to establish wireless communications 116 automatically upon signalling resources 105 coming into range of AP antennas 113. It will therefore be apparent that signalling resources 105 must remain energized at substantially all times so as to enable antennas 113 to detect signals as the user carries portable device 101 within range. Accordingly, signalling resources 105 require power sources so that they may remain energized at all times when they are likely to encounter antennas 113.

For some types of portable device 101, such as small PCS units, it may be acceptable to leave the unit permanently energized so that its signalling resources 105 constantly emits signals to antennas 113 that may be in range. It will of course be appreciated, however, that for the most common types of portable devices 101, i.e. notebook computers, leaving the unit permanently energized is not a viable option. First, notebook computers have a limited useful battery life, which would be disadvantageously wasted during periods when the user was distant from an AP. Second, many commercial brands of notebook computer tend not to dissipate heat well during long periods while closed but fully energized.

A solution to the problem is to design signalling resources 105 to be self-powered with an auxiliary power source. This is facilitated quite easily in the case of a PC card, which, as described above, is the likely embodiment of signalling resources 105 in a notebook computer. Since signalling resources 105 requires only a tiny portion of the operating power provided by the notebook computer's main power source, the PC card may be disposed to carry a small auxiliary power source, advantageously rechargeable by the notebook computer's main power source when the computer is fully energized. The auxiliary power source may energize signalling resource 105 to constantly emit signals in anticipation of coming into range of an AP antenna 113, even while the notebook computer's main power source is turned off. Further, the auxiliary power source may also energize auxiliary memory, auxiliary storage space, and an auxiliary processor to enable information to be automatically communicated, as described above with reference to FIG. 2, between the notebook computer and destination server 130 upon signalling resource 105 coming into range of AP antenna 113. Alternatively, the auxiliary power source may energize the computer's main memory, storage space and processor to enable communication of information. It would be further advantageous for the auxiliary power source also to provide a physical on/off switch, operable by the user in cases when signalling resource 105 is to be deactivated for a specific reason, such as to comply with aviation safety regulations, or when the user simply travels to locations where no APs 110 are known to be deployed.

Billing on a per-user, per connection basis

It will be readily understood from the foregoing description that establishment of tunnelled IP 124 on FIG. 1 creates a billable event. In other words, when tunnelled IP 124 is established through AP 110 between portable device 101 and destination server 130 (see block 217 on FIG. 2), information regarding the event may be captured and recorded. The event may then be invoiced for by conventional means.

Figure 3:
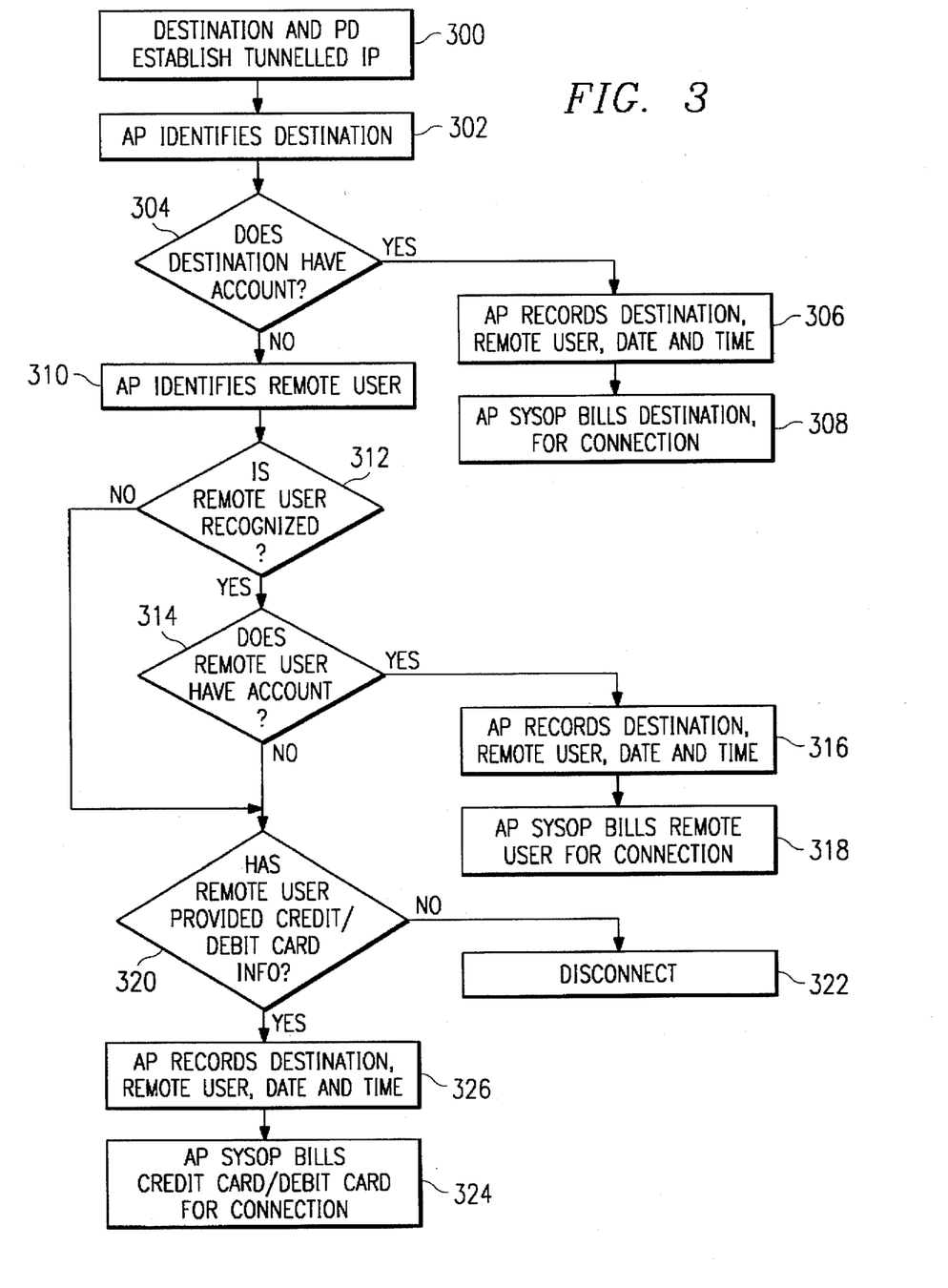
FIG. 3 is a flow chart illustrating an exemplary method of recording access by remote users to a data grade system of the present invention and billing pre-designated parties (advantageously either the remote user or the operator of the destination server) for such access.

By way of example, and not by way of limitation, FIG. 3 is a flow chart illustrating an exemplary method of recording access by remote users to a data grade system of the present invention and billing pre-designated parties (advantageously either the remote user or the operator of the destination server) for such access. As noted, method begins at block 301 with the establishment of tunnelled IP 124 over data grade connection 122. At this point, AP 110 identifies destination server 130 to see if it is associated with a pre-established billing account holder (blocks 302 and 304). If it is, then AP 110 records, in block 306, information regarding the connection to that account holder's file, such as destination server 130, the remote user's identity (from signature information included in signals from signalling resource 105), passwords, keys, the destination server 130, as well as the date and the time that the particular tunnelled IP 124 was established. The sysop of AP 110, or some other billing entity, then subsequently bills the account holder for the connection based on the recorded information accumulated in the account holder's file (block 308).

Returning to block 304, if AP 110 is unable to associate destination server 130 with a pre-established account holder, AP then tries to identify the remote user (blocks 310 and 312). Again, this may be done from signature information included in signals from signalling resource 105. If AP 110 recognizes the remote user as associated with a pre-established account holder (block 314), then AP 110 again records, in block 316, information regarding the connection to that account holder's file. The Sysop of AP 110, or some other billing entity, then subsequently bills the account holder for the connection, based on the recorded information accumulated in the account holder's file (block 318).

On the other hand, if, in block 312, the remote user is not recognized, or if, in block 314, a recognized remote user is not on file as being associated with a pre-established account holder, then AP 110 determines if the remote user has provided credit/debit card information (block 320). An unrecognized remote user may include this information in user signature information or other signals received from signalling resource 105. Similarly, a recognized remote user without an associated account holder may also provide this information in signals, or may alternatively pre-establish this information with AP 110.

Either way, if no credit/debit card information has been provided, then AP 110 disconnects the connection (block 322), since it has no way to collect charges for the connection. If, however, credit/debit card information has been provided, then AP 110 again records, in block 326, information regarding the connection to that credit/debit card account holder's file. The sysop of AP 110, or some other billing entity, then subsequently bills the credit card company for the connection, based on the recorded information accumulated in the file (block 324).

While FIG. 3 describes an exemplary billing method on a per-connection basis wherein AP 110 captures and records information, it will be understood that consistent with the present invention, these capture and record functions may also be performed by either the remote user's portable device 101, or by destination server 130. In such cases, software in portable device 101 or destination server 130 would act as a "meter," recording connection-related information as tunnelled IPs 124 are established. In such situations, the sysop of AP 110, or another billing entity would need to "read" the meters periodically to assess connection charges. Such "reading" could be advantageously enabled electronically during periods of connection by either the remote user or destination server 130 through AP 110. Alternatively, such "reading" could be enabled physically, similar to the way in which most electricity or water meters are still read today.

Although the present invention and its advantages have been described in detail, it should be understood that various changes, substitutions and alterations can be made herein without departing from the spirit and scope of the invention as defined by the appended claims.

I claim:

1. A method for billing for data grade network use on a per-connection basis, comprising the steps of:

establishing a data grade connection between a portable computing device and a destination server over a data grade Wide Area Network (WAN), wherein said establishing step includes the substeps of:

initiating the data grade connection by causing the portable computing device to communicate with a publicly-available, unrestricted intermediate access point, said communication including signature information identifying a remote user associated with the portable computing device, said communication further including a data grade WAN address of the destination server;

locating the destination server according to the data grade WAN address; and completing the data grade connection by linking the access point to the destination server over the data grade WAN;

enabling a tunnelled Internet Protocol (IP) over the data grade connection;

upon completing said enabling step, identifying a responsible party to bill for charges associated with executing said establishing step; and billing for said charges.

2. The method of claim 1, in which said billing step includes the substeps of:

recording transaction information relating to the data grade connection, wherein said transaction information includes (1) destination server, (2) remote user, (3) date of data grade connection, and (4) time of data grade connection;

memorializing said transaction information in a file associated with the responsible party; and sending periodic invoices to the responsible party based on records of previous data grade connections memorialized by said transaction information.

3. The method of claim 1, in which the responsible party is selected from the group consisting of:

(a) a pre-established account holder associated with the destination server;

(b) a pre-established account holder associated with the remote user; and (c) the holder of a credit/debit card account identified to the data grade connection.

4. The method of claim 2, in which said transaction information is recorded and memorialized by the intermediate access point.

5. The method of claim 2, in which said transaction information is recorded and memorialized by the portable computing device.

6. The method of claim 3, in which said transaction information is recorded and memorialized by the destination server.

7. A system for billing for data grade network use on a per-connection basis, comprising:

means for establishing a data grade connection between a portable computing device and a destination server over a data grade Wide Area Network (WAN), wherein said means for establishing further comprises:

means for causing the portable computing device to communicate with a publicly-available, unrestricted intermediate access point, said communication including signature information identifying a remote user associated with the portable computing device, said communication further including a data grade WAN address of the destination server;

means for locating the destination server according to the data grade WAN address; and means for linking the access point to the destination server over the data grade WAN;

means for enabling a tunnelled Internet Protocol (IP) over the data grade connection;

means, responsive to said means for enabling, for identifying a responsible party to bill for charges associated with establishing the data grade connection; and means for recording transaction information relating to the data grade connection, wherein said transaction information includes (1) destination server, (2) remote user, (3) date of data grade connection, and (4) time of data grade connection;

means for memorializing said transaction information in a file associated with the responsible party; and means for sending periodic invoices to the responsible party based on records of previous data grade connections memorialized by said transaction information.

* * * * *